United States Patent
Hengel et al.

(10) Patent No.: US 6,765,171 B1
(45) Date of Patent: Jul. 20, 2004

(54) PROJECTION WELDING OF FLANGED WELD NUT

(75) Inventors: James Franklin Hengel, Romeo, MI (US); David P. Kelly, Durand, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/376,896

(22) Filed: Feb. 28, 2003

(51) Int. Cl.⁷ ............................................. B23K 11/14
(52) U.S. Cl. ........................................................ 219/93
(58) Field of Search ................................. 219/93, 117.1

(56) References Cited

U.S. PATENT DOCUMENTS 3,219,790 A * 11/1965 Johnson ........................ 219/93
5,508,488 A * 4/1996 Aoyama et al. ............... 219/93
6,355,900 B1 * 3/2002 Sherman .................... 219/117.1

* cited by examiner

Primary Examiner—Clifford C Shaw
(74) Attorney, Agent, or Firm—Kathryn A. Marra

(57) ABSTRACT

This invention provides a method of welding a flange nut to a workpiece surface using an improved design of a welding electrode. The electrode comprises a parts-receiving recess adapted to receive a stem portion of the nut, while maintaining a clearance between the recess and the stem. This clearance allows electrical current to be directed toward the flange portion of the nut. As a result, electrical contact between the workpiece and projections underlying the flange is greatly improved, thereby produce higher quality spot welds and increasing the life of the electrode tip.

6 Claims, 1 Drawing Sheet

PROJECTION WELDING OF FLANGED WELD NUT

TECHNICAL FIELD

This invention generally relates to welding flange nuts to other objects and, more specifically, to a method of welding a flange nut to a workpiece by directing current flow through weld projections on the flanged portion of the nut. An improved electrode design facilitates use of the method.

BACKGROUND OF THE INVENTION

Flanged nuts have integral washers that simplify handling. They are useful in assembling components using a bolt fastener and the flange can bridge an oversized hole in an attached object. Flange nuts are commonly pre-attached to an object so that the object can be bolted to something else. This method of attachment is useful in joining automotive body parts using welded flange nuts, which facilitates the assembly of the vehicle.

Projection welding is a common practice for joining a flange nut to a metal sheet or other workpiece. Integral projections on the metal sheet contacting side of the flange provide fusible metal for the weld. Two counter-acting welding electrodes with flat contact surfaces hold the flange nut and workpiece together at a joining region with the projections on the flange pressing against the surface of the workpiece. A controlled electrical power source delivers a pulse of high amperage AC (or rectified AC) current through the facing electrodes, through the interposed nut, and the workpiece. Typically a 60 Hertz welding current is applied for several cycles of electrical current application (i.e., a fraction of a second). Although the entire nut and underlying workpiece area are heated, the higher density and momentary current flow through the projections tend to selectively melt the projections. When the current flow is stopped, the melt solidifies and the projections are fused to the workpiece.

Currently, flange nut welding processes use a copper welding electrode with a flat, full faced electrode tip to engage the top of the flange nut. The flat welding electrode tip is large enough to fit flange nuts of different sizes and it is effective in applying clamping pressure on the flat surface of the top of the nut's stem. However, the current flow through the stem may be sufficient to soften it during the brief welding period and the hot electrode can stick to the workpiece. The counteracting electrode, which engages the opposite side of the workpiece, usually experiences no such sticking.

Thus, it is an object of the present invention to provide an improved method for welding a flange nut to a workpiece, such as a sheet metal part. The purpose of the method is to avoid sticking of nut metal to the electrode and thus to increase the reliability of the process in production and to increase the useful life of the electrode tip. It is a further object of the present invention to provide an improved electrode tip design for contacting the flange nut during welding and to facilitate the practice of the process.

SUMMARY OF THE INVENTION

The present invention provides a method of welding a flange nut to a surface of a metal sheet, or other workpiece, using an electrode design for the nut that engages only the flange portion of the nut.

A flange nut, comprising a stem, a flange at one end of the stem, and a hole extending through the stem, is welded to the workpiece at a predetermined attachment location. Typically, the workpiece will have a bolt hole, or the like, at the welding location so that after attachment of the flange nut the workpiece can be bolted to another object.

The flange portion of the nut, having pre-formed underlying projections for welding, is placed against the surface of the workpiece so that the projections lie against it and separate the nut from the workpiece by the height of the projections. Opposing electrodes engage the nut and the opposite side of the workpiece, pressing them together for effective welding force and current flow. A suitable welding current is then directed to the electrodes and through the flange portion of the nut, through the weld material projections from the flange, and through the abutting workpiece. The duration of current flow is brief, typically less than a second. The current density in the relatively small projections is sufficient to fuse them without fusing the larger flange material that carried them. The molten metal from the melted projections flows between the flange and workpiece surface or is expelled under the pressure of the electrodes. When current flow is stopped the molten metal is cooled and solidified by heat flow to the cooler surrounding metal of the nut and workpiece.

The weld material projections are integral with the flange and formed of the same material. They provide sufficient metal for the weld. Often the flange is round and formed by upsetting one end of the stem of the nut. The projections are formed at the same time and may, for example, be shaped like truncated cones spaced in a circle around the bottom surface of the flange. However, in a preferred embodiment of the invention, the weld projections are tapered and spaced circularly on the bottom of the flange.

The method of the present invention preferably employs a welding electrode having an improved design for better weld quality. The electrode for engaging the flange nut comprises a recess formed in the face of the electrode tip that enables the rim of the electrode tip to fit over the stem portion of the nut without touching it. As a result, the hollow electrode tip establishes clamping pressure and electrical contact with only the flange portion of the nut. The current then passes mainly through the flange and its underlying projections to the workpiece metal. The contact of the annular electrode tip with the flange of the nut does not result in flange metal adhering (sticking) to the electrode during the projecting welding operation.

Industrial processes rely on the durability of their welding electrodes to produce hundreds of individual welds having superior weld quality without constant replacement of the electrodes. Electrode sticking usually degrades an electrode tip and impedes current flow. The method and electrode design of the present invention reduces electrode failure and welding inefficiencies by redirecting the electrical current away from the stem portion of the nut. The result is improved weld quality and improved life of the electrode tip.

These and other objects and advantages of this invention will become apparent from a detailed description of the preferred embodiment that follows.

DESCRIPTION OF THE PREFERRED EMBODIMENT

Figures 1, 2:
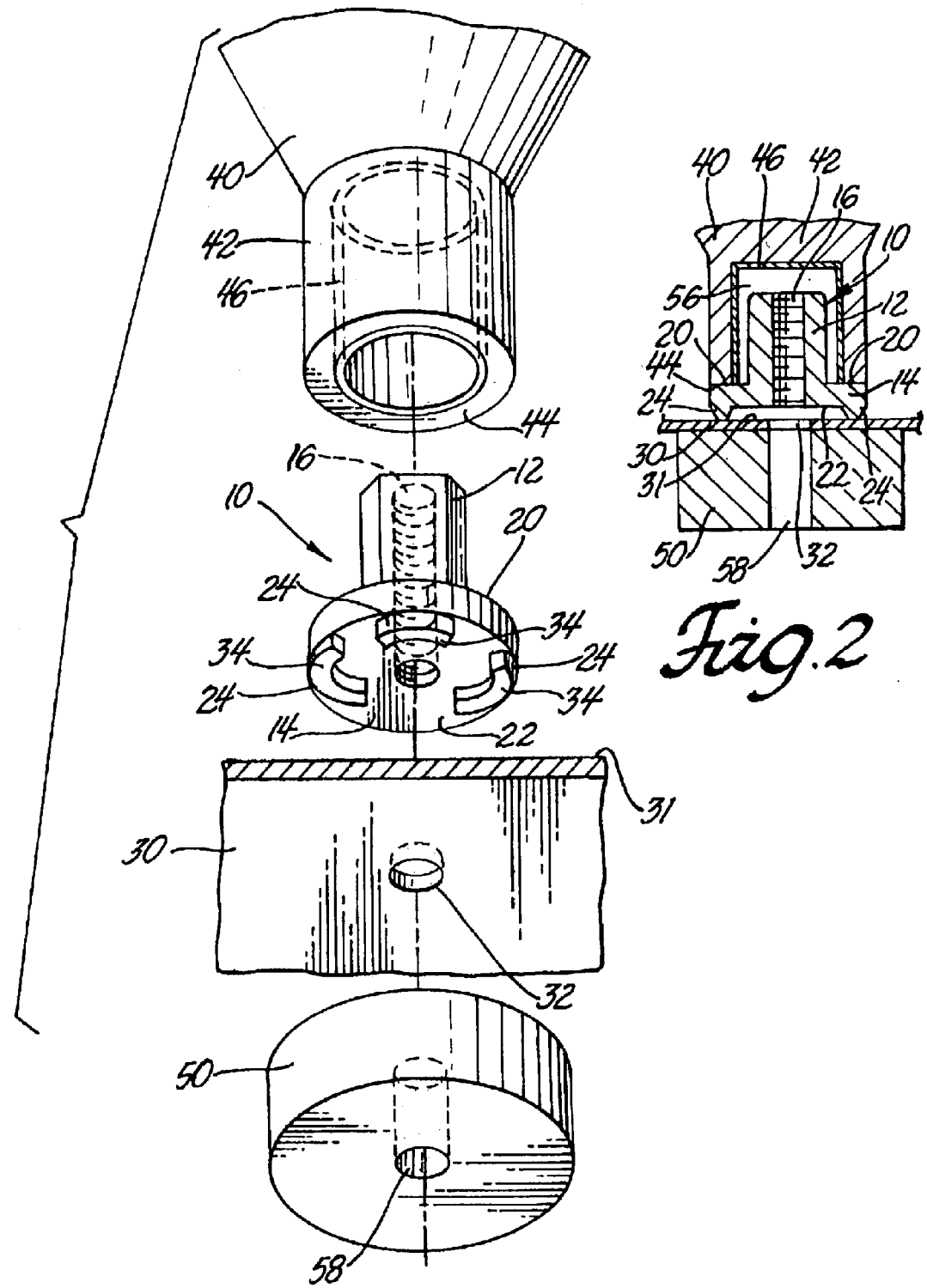
FIG. 1 is an exploded view of a flange nut-to-workpiece and welding electrode assembly for use in practicing the present invention.
FIG. 2 is a side view, in cross-section, of the welding assembly showing how the hollow, flat rimmed electrode tip fits over the stem portion of the flange nut to press against the upper surface of the flange without contacting the stem.

The welding method and electrode design of the present invention provide improved welding current contact between the workpiece and welding projections from the flange nut. Weld quality is increased and electrode sticking is reduced. This process is generally referred to as projection welding. Projection welding is a form of resistance welding in which current flow and heat are localized in weld metal projections that are integral with an object to be welded.

A preferred embodiment of the present invention is illustrated in FIGS. 1 and 2. FIG. 1 shows the opposing electrodes, as well as the flange nut and sheet metal to be joined, in a separated but juxtaposed position so that their shapes and interaction can be more clearly illustrated. FIG. 2 shows the objects and electrodes in a sectional view assembled for welding in accordance with this invention.

Flange nut 10 is seen as an oblique, generally side view in FIG. 1. A typical flange nut 10 comprises a stem 12 that is often hexagonal in cross-section and a larger diameter round flange 14. Flange 14 can act like an integral washer. A central hole 16 extends through stem 12 and is adapted to receive a fastener (not shown), such as a guide pin, a bolt, a screw, or the like. Hole 16 is illustrated as threaded but it may be plain. Depending on the type of fastener used and the attachment part to be joined to the workpiece after the nut has been welded thereon, hole 16 can be provided in any shape, size or form.

Flange 14 of nut 10 comprises an upper circular surface 20 surrounding stem 12. Upper surface 20 of flange 14 will be contacted by a welding electrode as described below. Flange 14 also has a lower circular surface 22 that carries three integral underlying arcuate projections 24. Projections 24 will ultimately be welded to sheet metal part 30 as will be described.

A projection is a small mass of welding material, comprising any shape or size, and is typically the same material as that of flange nut with which it is formed. In this example, projections 24 are formed integrally with lower or joining surface 22 of flange 14 and located for welding of the flange nut to a sheet metal article or other part. For illustrative purposes, three quadrilaterally-shaped (in cross-section) projections 24 that taper toward the workpiece surface are shown in FIGS. 1 and 2. However, more or less projections of any suitable shape can be used in practicing the method of the present invention.

Generally, a flange nut 10, comprising underlying welding projections 24, is placed on a facing surface 31 of a selected workpiece 30 at a joining region. In this example, workpiece 30 is a sheet metal article with a bolt hole 32 at the intended flange nut 10 attachment location. Flange nut 10 with its welding projections 24 is positioned over a bolt hole 32 in contact with surface 31 of sheet metal workpiece 30. Only the flat bottom surfaces 34 of projections 24 actually engage surface 31 prior to welding. The assembled weld nut 10 and workpiece 30 are pressed together by welding electrode 40 and counter-electrode 50. Electrode 40 engages the flange nut 10 and counter-electrode 50 engages the opposite side of workpiece 30. Electrodes 40 and 50 are used to press flange nut 10 and workpiece 30 into tight engagement for welding and to deliver a suitable pulse of welding current for fusion of projections 24 to accomplish the weld. Resistance to electrical current by the workpiece metal generates heat in the flow path of the current, thereby causing the metal located at the joining region to melt. Nut 10 is then pushed, by the electrode force, into the molten metal of workpiece 30. Upon cooling, the molten material solidifies and forms a weld.

Weld quality often depends on suitable electrical contact area of projections 24 with workpiece 30. The three projections 24 are arcuate in shape (suitably about 60 degrees of arc) with square, or quadrilateral or triangular cross-sections that taper toward a flat workpiece contacting surface 34. Projections 24 are sized in proportion to varying flange sizes in order to accomplish a consistently high quality weld. Furthermore, projections 24 are arranged on weld surface 22 to uniformly engage workpiece 30.

When flange nut 10 is placed on workpiece 30 prior to welding, flange nut 10 is positioned such that projections 24 formed on weld surface 22 of flange 14 directly contacts workpiece 30. If a guide pin is to be inserted through the workpiece and weld nut as a locating device, flange nut 10 will be placed on workpiece 30 over an opening 32, directly aligning central hole 16 of nut 10. Backup 50, also comprising a hole 58, is arranged in a similar fashion for insertion of a guide pin.

Electrode 40 is specially designed for pressure application and weld current delivery to flange nut 10. Only the tip portion of electrode 40 is shown in FIGS. 1 and 2, the remainder of the electrode being of suitable standard configuration for the welding of workpieces. Specifically, the welding tip 42 of electrode 40 is a hollow circular cylinder sized to receive stem 12 of nut 10 without contacting stem 12. The end of welding tip 42 has a flat contact surface 44 for pressure and current supplying engagement with upper surface 20 of flange 14. Electrode tip 42 is generally cylindrically shaped, however it can be shaped to suitably fit over flange nuts of varying conformations. Furthermore, tip 42 may be adapted to receive adjustable electrical insulator or conductive inserts 46 where each insert is sized and shaped to accommodate a specific flange nut stem design. The insert 46 shown in FIG. 1 is simply a cylinder shaped conductor for increased electrode contact with flange 20 without contacting hexagonal stem portion 12 of flange nut 10. Depending upon the fit between the electrode tip 42 and stem 12 it may be desired to use an insert 46 to prevent contact between the tip 42 and stem 12. These adjustable inserts can be inserted in hollow electrode tips 42 by any suitable means, such as snapping or screwing. Alternatively, the adjustable inserts can simply be a series of removable electrode tips where each tip comprises a recess sized and shaped to accommodate a specific flange nut design. Again, the electrode tips can be attached to electrode 40 by any suitable means.

In accordance with this invention, electrode tip 42 is intended to contact only the upper surface 20 of flange 14. The purpose of hollow tip 42 is to deliver the welding current only through flange 14 and projections 24 to workpiece 30 and counter-electrode 50. Thus, when electrode 40 is placed over nut 10 (i.e., where stem 12 fits inside electrode tip 42), it is preferred that no surface of stem 12 touches or contacts any inner surfaces of tip 42. Otherwise, any direct contact between electrode 40 and stem 12 will direct a substantial amount of electrical current toward stem 12 rather than toward projections 24 located on flange 14. As a result, current density will be lower at the projection-to-workpiece interface, thereby creating spot welds having inadequate weld quality.

Generally, when a conventional electrode directs electrical current through the stem 12 of a flange nut and a workpiece, the electric current traveling through weld surface 20 of flange 14 is a relatively low density current. This requires longer welding current flow cycles, which unnecessarily heats the stem portion of the nut leading to electrode wear and poor welding results. The subject process and electrode design concentrates the welding current where it is needed to reduce electrode degradation and improve welding results.

Electrode contact with and current flow through stem 12 will cause significant temperature increases at the contacted surface. This, in effect, causes a conventional electrode 40 to stick to the top surface of the nut which can eventually destroy the electrode tip. As illustrated in FIG. 2, electrode tip 42 is designed to receive nut 10 while maintaining a clearance 56 between the outer surfaces of stem 12 and the inner surfaces of tip 42. Electrical current flow from tip 42 is localized at flange 14. Welding current is specifically directed through projections 24 to workpiece 30. The relatively high current density caused by the practice of this invention and the electrical resistance of projections 24 promotes rapid and effective melting of the intended weld material in the projections. The effective pressure delivered by tip 42 to flange 20, the shape of projections 24 and the concentrated heating at their contact with workpiece surface 31 leads to the reliable formation of effective welds between nut 10 and workpiece 30. After termination of the welding current pulse the molten metal is cooled by the surrounding metal masses and flange nut 10 is welded to workpiece 30 as a result of the coalescence. Uniform division of welding current and relatively even heating of all projections is provided, thereby creating a high quality weld and minimal damage of the electrode tip.

While the invention has been described in terms of a preferred embodiment, it is not intended to be limited to that description, but rather only to the extent of the following claims.

What is claimed is:

1. A method of welding a flange nut to a workpiece surface, said nut comprising a stem, a flange, and a central hole extending through at least one end of said nut, and said flange comprising first and second flange surfaces where said first flange surface comprises underlying projections to be fused to said workpiece surface by the passage of electrical current through said projections, said welding method comprising the steps of:

placing said flange nut on said surface at a joining region where said projections lie against said flat surface; and passing an electrical current directly through said flange, projections and workpiece surface to fuse said projections against said workpiece surface; and stopping said electrical current to form a weld.

2. A welding method as recited in claim 1 comprising pressing an electrode against said flange without electrode contact with said stem and pressing said projections against said workpiece surface.

3. A welding method as recited in claim 2 wherein said electrode comprises a hollow electrode tip with a flange contacting surface, said hollow tip being adapted to receive said stem portion of said nut without electrode contact with said stem.

4. A welding method as recited in claim 3 further comprising providing an electrode tip with a stem-receiving hollow recess, said recess adapted to receive an conductive insert where said insert conforms to the size and shape of said stem of said flange nut.

5. A welding method as recited in claim 1 in which said flange nut comprises projections having cross-sections and extending from said flange for engaging said workpiece surface, said cross-sections becoming smaller in a direction toward said workpiece surface.

6. A welding method as recited in claim 5 wherein said cross-sections are triangular or quadrilaterally shaped.

* * * * *